Aug. 5, 1958 — C. L. GOODZEIT — 2,845,918
BEARING SURFACES
Filed March 7, 1955

INVENTOR
Carl L. Goodzeit
BY
ATTORNEY

United States Patent Office 2,845,918
Patented Aug. 5, 1958

2,845,918

BEARING SURFACES

Carl L. Goodzeit, Birmingham, Mich., assignor to General Motors Corporation, Detroit, Mich., a corporation of Delaware Application March 7, 1955, Serial No. 492,481

10 Claims. (Cl. 123—193)

This invention relates to bearing parts and particularly to an arrangement wherein a surface of an aluminum base metal is in bearing contact with a surface of a cadmium base metal. The present invention is especially useful in internal combustion engines in which one of the bearing parts is a cylinder wall and the other is a piston reciprocable within the cylinder.

During recent years there has been an increased use of aluminum base bearing parts in automotive and related applications. For example, today the vast majority of the pistons of automobile gasoline engines are formed of aluminum rather than cast iron. It is always desirable in such bearing applications to improve the frictional properties of the rubbing surfaces of pistons and cylinders and to substantially eliminate the possibility of galling or seizure of these surfaces. Reducing the rubbing or sliding friction between the walls of the cylinders and pistons not only decreases the amount of wear of these parts but also increases the efficiency of the engine.

Accordingly, a principal object of the present invention is to provide an arrangement of bearing surfaces which conjointly possess outstanding frictional properties and high score resistance. A further object of this invention is to provide a reciprocating machine, such as an internal combustion engine, in which the amount of friction between the pistons and adjacent cylinder walls is extremely low and in which the contacting surfaces of these parts possess excellent resistance to galling or seizure.

These and other objects are attained in accordance with this invention by an aluminum or aluminum base alloy part which is in sliding engagement with a part formed of cadmium or cadmium base alloy. In the case of internal combustion engines, aluminum or aluminum coated pistons may be used in conjunction with cadmium coated surfaces of cylinders. Alternatively, cadmium coated pistons may reciprocate within cylinders having aluminum surfaces. In either event, the sliding friction between piston skirts and the walls of mating cylinders is substantially reduced. It may be convenient in some instances to provide the cadmium and/or the aluminum bearing surface as a coating layer over a base metal of dissimilar material. Such a coating may be applied by plating or other suitable means.

Other objects and advantages of this invention will more fully appear from the following detailed description of preferred embodiments of the invention taken in conjunction with the accompanying drawing, in which.

Figure 2:
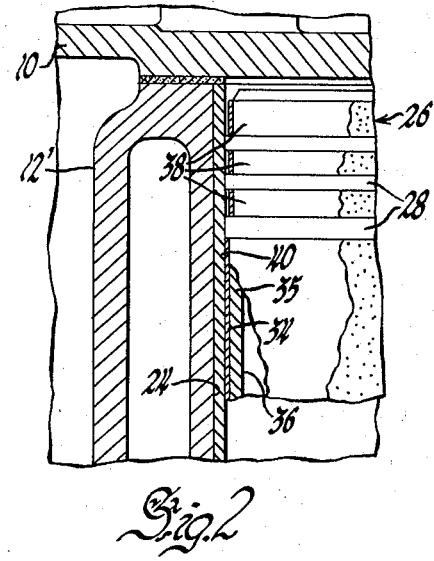
Figure 2 is a somewhat enlarged, fragmentary sectional view of the internal combustion engine shown in Figure 1, but having a cast iron cylinder block provided with an aluminum coating or liner constituting the cylinder walls.
Figure 3:
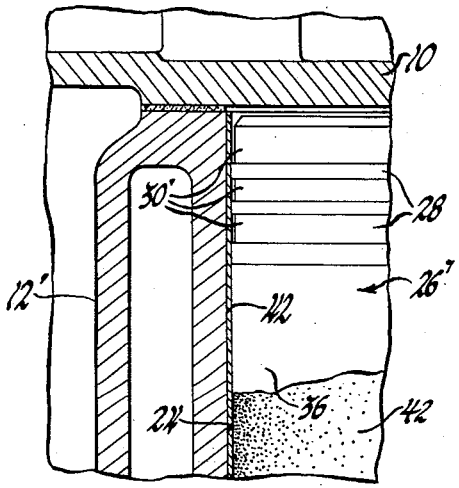
Figure 4:
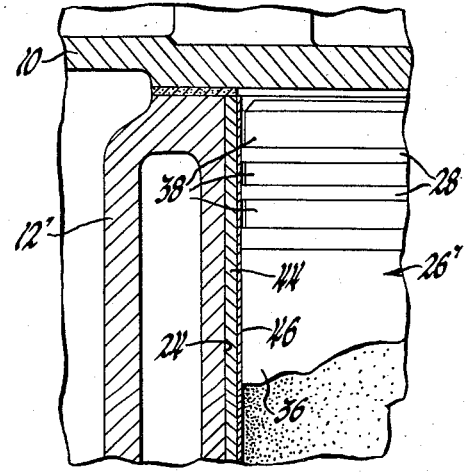

Figure 3 is a fragmentary sectional view generally similar to Figure 2, showing an internal combustion engine having an aluminum piston within a cast iron cylinder block provided with a cadmium coating on the surfaces of the cylinder; and Figure 4 is a fragmentary sectional view generally similar to Figures 2 and 3, showing an internal combustion engine having a cast iron cylinder block, a ferrous base cylinder liner provided with a cadmium coating on its bearing surface, and an aluminum piston within the cylinder defined by the coated liner.

Figure 1:
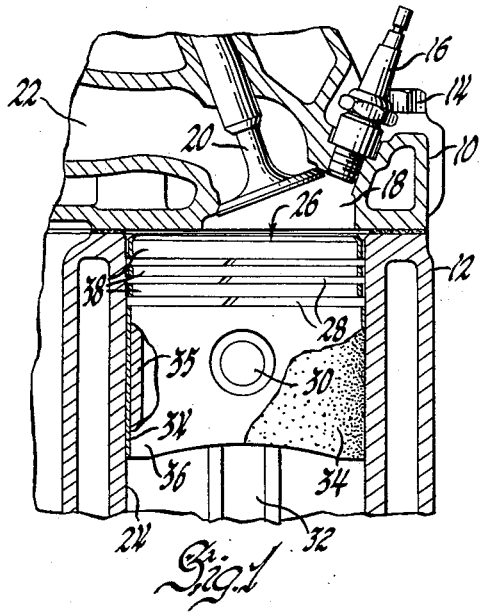
Figure 1 is a sectional view of a portion of an internal combustion engine having a cadmium coated piston reciprocably mounted within an aluminum cylinder block.

Referring more particularly to the drawing, in Figure 1 is shown an internal combustion engine having a cylinder head 10 and a cylinder block 12 secured together by means of bolts 14. Mounted in the cylinder head is a spark plug 16 for igniting an air-fuel mixture within a combustion chamber 18. A poppet valve 20 for opening and closing a valve port 22 also is located in the head. Reciprocably secured within the block 12 and in sliding contact with the surfaces 24 of the cylinder or bore thereof is a piston, indicated generally at 26, of conventional construction provided with the usual split piston rings 28, wrist pin 30 and connecting rod 32.

In the modification of the invention shown in Figure 1 the cylinder block 12 is cast of aluminum while the piston, which can be formed of either cast iron or aluminum, is provided with a coating 34 of cadmium or cadmium base alloy. The use of this coating on the outer surfaces of the side walls 35 of the piston measurably reduces the sliding friction between the cylinder walls and the piston skirts, thus increasing the efficiency of the engine or other machine in which it is used. Furthermore, the cadmium coating does not adversely affect lubricating oils or the metallic surfaces of pistons or cylinders.

It is necessary to use only a very thin layer or coating of cadmium or cadmium base alloy in order to substantially reduce the rubbing friction between the piston and the adjacent aluminum cylinder wall. It will be appreciated, of course, that the thickness of the cadmium layer is greatly exaggerated in the drawing for purposes of clarity and that a coating having a thickness of only a few thousandths of an inch is usually satisfactory.

Likewise, while the cadmium coating is shown as applied to all the outer cylindrical side surfaces of the piston, it should be understood that usually it is necessary to coat only the skirt portions 36 of the piston. In most pistons of internal combustion engines the diameter of the portions 38 of the piston adjacent the piston rings 28 is less than the diameter or lateral extension of the skirts, as shown in the drawing, and normally do not contact the cylinder walls. Hence, although it may be more convenient from a processing standpoint in some instances to coat the surfaces of the portions 38 as well as the piston skirts 36, it is not normally necessary to do so. Of course, it is advantageous to provide the portions 38 of the piston with a cadmium coating if these portions have the same approximate diameter as the skirts.

The coating of cadmium or cadmium base alloy may be applied by any conventional dipping or plating operation. It is normally preferable to apply the cadmium coating by electrodeposition.

In the modification of the invention shown in Figure 2 the piston 26, which is similar to the piston of Figure 1, is likewise provided with a cadmium coating on the outer surfaces of its side walls 35. However, in this instance the cylinder block 12' is formed of cast iron rather than aluminum. Hence an aluminum cylinder liner or coating 40 is provided in the block. If an aluminum liner or sleeve is used, it may be cast in place or a cast liner may be secured within the cylinder block by means of a shrink fit, a brazing operation, or other suitable means. Alternatively, the cylinder surfaces 24 of the block may be provided with a thin coating of aluminum or aluminum base alloy. Such a coating can be applied by a hot dipping operation, such as one of the procedures described in Patent No. 2,569,097 Grange et al., or by means of the process described in co-pending patent application Serial No. 459,093, filed September 29, 1954, in the names of Robert F. Thomson, Albert A. Shoudy, Jr., and Dean K. Hanink. The latter procedure involves applying the aluminum in the form of a paint or paste containing aluminum powder or applying aluminum by a hot spraying operation. The latter practice is commonly referred to as metallizing. Subsequent heat treatment results in a secure bond between the aluminum coating and the cast iron. As in the case of the cadmium coating, the layer of aluminum need have a thickness of only a few thousandths of an inch. A somewhat thicker aluminum coating is normally preferred, however.

Referring now to Figure 3, there is shown a preferred modification of the invention in which an aluminum piston 26' reciprocates within a cast iron cylinder block 12'. With this arrangement the cylinder surfaces 24 of the block, rather than the piston, are provided with the cadmium layer 42. Hence, the outer surfaces of the piston need not be treated in any particular manner. Of course, these surfaces may be anodized or provided with a very thin break-in coating of tin such as is produced by immersion in a hot aqueous solution of sodium stannate. Such procedures are conventional, of course, and do not constitute part of the invention.

The embodiment of the invention shown in Figure 4 is similar to the construction illustrated in Figure 3 except a cylinder liner or sleeve 44, preferably of cast iron or steel, is employed. In this instance, the cadmium coating 46 is applied to the inner cylindrical bearing surfaces of the liner rather than to the walls of the block itself. Since this liner normally would be formed of steel, it may be effectively secured within the cylinder block by means of a shrink fit or in any other appropriate manner. As indicated above, of course, it is not necessary to use a cylinder liner and, if it is feasible from a practical standpoint, the cylinder-defining walls of the block itself may be coated with cadmium or cadmium base alloy. However, in many instances it may be more convenient under production conditions to provide the liner with a cadmium coating rather than coating the cylinder block casting.

Of course, if it is preferred to use a cast iron piston in conjunction with the cylinder wall construction shown in Figures 3 and 4, the piston may be provided with an aluminum coating. This coating may be applied in the same manner as the aluminum coating on the cylinder block walls of the modification shown in Figure 2. The above remarks as to the surfaces of the piston which should be coated with cadmium are also applicable where the piston is aluminum coated. Likewise, an aluminum coated steel or cast cylinder liner, such as the sleeve 44 in Figure 4, may be used in combination with the cadmium coated pistons shown in Figures 1 and 2.

Thus it will be seen that in each of the above-described embodiments of the invention either the cylinder-defining walls of the cylinder block or the piston is provided with a coating of cadmium or cadmium base alloy and the other of these members has an aluminum surface. Excellent anti-friction properties are obtained in each instance. It is also evident from the above description, of course, that the present invention in its broader aspects is not limited to piston and cylinder wall constructions. The word "bearing," as used herein, is therefore intended to include all such applications in which relatively moving parts are in engagement and in which good frictional properties and high score resistance of the contacting metal parts are desirable.

Various cadmium base alloys, as well as commercially pure cadmium, may be used as the coating material. For example, a cadmium alloy containing 10% tin and the balance substantially all cadmium and cadmium base alloys containing up to 5% silver are appropriate. The cadmium alloy likewise may advantageously contain small amounts of copper and tin. Hence, it will be understood that the terms "cadmium" and "cadmium base alloy" are interchangeably used herein and are intended to encompass various alloys in which cadmium constitutes the major constituent, particularly those alloys which contain more than 50% cadmium.

Similarly, the aluminum bearing part may be formed of either pure aluminum or an aluminum base alloy. In accordance with a preferred embodiment of the invention, the typical aluminum alloy piston materials provide excellent results. A highly satisfactory piston alloy is one comprising approximately 8.5% to 10.5% silicon, 2% to 4% copper, 0.5% to 1.5% magnesium, nickel not in excess of 1.5% and the balance substantially all aluminum. Normally it is desirable if the nickel content of such an alloy is between about 0.5% and 1.5%. Small amounts of iron, manganese, zinc and titanium also are usually present in aluminum piston alloys of this type. It is generally preferred that the manganese and zinc contents not exceed approximately 0.5% each, while the titanium content normally should not be greater than about 0.2%. Other elements may be present in small amounts, but it is desirable if they do not exceed approximately 0.5%.

Of course, for typical journal bearing applications aluminum base alloys having different percentages of the aforementioned constituents may be employed. Also other elements, such as cadmium, chromium, lead, bismuth, tin and indium can be included in the bearing material. Various incidental impurities also may be present in the usual small amounts without any substantial detrimental effects. Hence the various aluminum base bearing alloys disclosed in co-pending patent applications Serial Nos. 250,191, 250,192, 276,877, 328,265, 328,266, 346,780, 349,301, now respectively Patents Nos. 2,766,-116, 2,763,546, 2,807,540, 2,752,239, 2,752,240, 2,754,-202 and 2,770,031 and 349,302 filed April 16, 1953, all in the name of Alfred W. Schluchter, are appropriate for use in accordance with the present invention. In general, the preferred maximum amounts of these constituents are approximately as follows: magnesium 3%, cadmium 5%, silicon 11%, chromium 2.25%, iron 0.5%, nickel 4%, copper 5%, lead 3%, bismuth 5%, tin 0.3% and indium 0.5.

Best results are obtained when the aluminum base alloy contains about 75% to 97% aluminum. However, it will be understood that the terms "aluminum" and "aluminum base alloy," are co-extensively used herein as including alloys in which aluminum is the major constituent and preferably constitutes at least 50% of the alloy.

While the invention has been described by means of certain specific examples, it is to be understood that the scope of the invention is not to be limited thereby except as defined in the following claims.

I claim:

1. A bearing assembly comprising a pair of relatively movable parts having surfaces in sliding contact, one of said surfaces being formed of a metal selected from the group consisting of cadmium and cadmium base alloys and the other of said surfaces being formed of a metal selected from the group consisting of aluminum and aluminum base alloys.

2. A bearing assembly comprising an element having a surface formed of a metal selected from the group consisting of aluminum and aluminum base alloys and a second element provided with a thin coating of a metal selected from the group consisting of cadmium and cadmium base alloys, said surface and said coating being in sliding contact.

3. A bearing assembly comprising a pair of relatively movable parts in sliding contact with one another, the contacting surface of one of said parts being formed of a metal containing at least 50% cadmium and the contacting surface of the other of said parts being formed of a metal containing at least 75% aluminum.

4. In a reciprocating machine having a cylinder member and a piston member reciprocable within said cylinder member, one of said members having its surface which contacts the other of said members formed of an aluminum base alloy, and the other of said members having its surface contacting said first member formed of a metal selected from the class consisting of cadmium and cadmium base alloys.

5. In a reciprocating machine, the combination of a cylinder block provided with a cylinder bore and a piston reciprocably mounted within said bore, the cylinder-defining surfaces of said block being formed of an aluminum base alloy, a thin layer of cadmium on said piston constituting its cylinder-contacting surfaces.

6. A reciprocating machine comprising a cast iron cylinder block provided with a bore having generally cylindrical surfaces coated with a metal selected from the class consisting of cadmium and cadmium base alloys, and a piston reciprocably positioned within said bore, said piston having its other side surfaces formed of an aluminum base alloy.

7. A reciprocaitng machine comprising a cast iron cylinder block provided with a bore having generally cylindrical surfaces coated with a thin layer of cadmium, and a cast iron piston reciprocably mounted within said bore, outer side surfaces of said piston being provided with a a thin coating of aluminum in sliding contact with said layer.

8. An internal combustion engine comprising a cylinder block, a cylinder head secured to said block and defining a combustion chamber therewith, said cylinder block having a bore communicating with said combustion chamber, the cylinder-defining walls of said bore being provided with a layer of an aluminum alloy, and a piston reciprocably mounted within said bore, said piston having outer cylindrical surfaces thereof provided with a thin coating of a metal selected from the group consisting of cadmium and a cadmium base alloy.

9. An internal combustion engine comprising a cylinder block, a cylinder head secured to said block and defining a combustion chamber therewith, said cylinder block having a cylinder bore communicating with said combustion chamber, a sleeve formed of a ferrous base metal fitted within said bore and having inner cylindrical surfaces coated with an aluminum alloy, and a piston reciprocably mounted within said liner, said piston having its outer side surfaces in contact with said aluminum alloy provided with a coating of a metal selected from the class consisting of cadmium and cadmium base alloys.

10. In an internal combustion engine, a cylinder block formed of cast iron and provided with a generally cylindrical bore, a ferrous metal cylinder liner secured within said bore, said liner having inner cylinder-defining surfaces provided with a thin coating of a metal selected from the group consisting of cadmium and cadmium base alloys, and a piston reciprocably mounted within said bore and having outer side surfaces in contact with said coating, said piston being formed of an alloy comprising approximately 8.5% to 10.5% silicon, 2% to 4% copper, 0.5% to 1.5% magnesium, nickel not in excess of 1.5% and the balance substantially all aluminum.

References Cited in the file of this patent

UNITED STATES PATENTS

| | | |
|---|---|---|
| 1,979,476 | Labaw | Nov. 6, 1934 |
| 2,288,655 | Smart | July 7, 1942 |
| 2,414,617 | Summers | Jan. 21, 1947 |

UNITED STATES PATENT OFFICE
CERTIFICATE OF CORRECTION

Patent No. 2,845,918

August 5, 1958

Carl L. Goodzeit

It is hereby certified that error appears in the printed specification of the above numbered patent requiring correction and that the said Letters Patent should read as corrected below.

Column 5, line 22, for "other" read -- outer --.

Signed and sealed this 4th day of November 1958.

(SEAL)
Attest:

KARL H. AXLINE
Attesting Officer

ROBERT C. WATSON
Commissioner of Patents